US012570037B2

(12) United States Patent (10) Patent No.: US 12,570,037 B2
Montanari et al. (45) Date of Patent: Mar. 10, 2026

(54) METHOD FOR TEXTURING A POLYAMIDE

(71) Applicant: Arkema France, Colombes (FR)

(72) Inventors: Thibaut Montanari, Serquigny (FR);
Christelle Recoquille, Serquigny (FR)

(73) Assignee: ARKEMA FRANCE, Puteaux (FR)

( * ) Notice: Subject to any disclaimer, the term of this
patent is extended or adjusted under 35
U.S.C. 154(b) by 816 days.

(21) Appl. No.: 17/602,944

(22) PCT Filed: Apr. 7, 2020

(86) PCT No.: PCT/EP2020/059891
§ 371 (c)(1),
(2) Date: Oct. 11, 2021

(87) PCT Pub. No.: WO2020/208016
PCT Pub. Date: Oct. 15, 2020

(65) Prior Publication Data
US 2022/0161463 A1 May 26, 2022

(30) Foreign Application Priority Data

Apr. 12, 2019 (FR) ...................................... 1903934

(51) Int. Cl.
B29C 59/02 (2006.01)
B29C 37/00 (2006.01)
(Continued)

(52) U.S. Cl.
CPC .......... B29C 59/02 (2013.01); B29C 37/0032
(2013.01); B29C 45/1418 (2013.01);
(Continued)

(58) Field of Classification Search
CPC . B29C 59/02; B29C 59/005; B29C 45/14827;
B29C 45/1418;
(Continued)

(56) References Cited

U.S. PATENT DOCUMENTS

2006/0030692 A1* 2/2006 Montanari ........... C09D 177/00
528/310
2009/0160087 A1* 6/2009 Yang ................. B29C 45/14827
264/271.1
(Continued)

FOREIGN PATENT DOCUMENTS

JP H11179735 A 7/1999
JP 2007022081 A 2/2007
(Continued)

OTHER PUBLICATIONS

Office Action with English translation mailed on Feb. 22, 2024, by
the Japanese Patent Office for Japanese Application No. (2021-
559642), 10 pages.

*Primary Examiner* — Jerzi H Moreno Hernandez
(74) *Attorney, Agent, or Firm* — Boone IP Law

(57) ABSTRACT

A method for preparing an object including at least one film
including at least one layer including a composition includ-
ing at least one semi-crystalline polyamide having a melt
enthalpy of between 25 J/g and 75 J/g, the film having on all
or part of at least one of its surfaces the texture of a texturing
element, wherein the method includes: a. providing a mold
set to a temperature less than or equal to 120° C.; b. applying
to the wall of the mold, at least one texturing element, and
having at least partially a textured surface, the textured
surface being on the face opposite that facing the mold; c.
applying to the textured surface of the texturing element, at
least one film comprising at least one layer, the thickness of
the layer being at least 10 μm; d. applying heat and pressure
to the film.

22 Claims, 1 Drawing Sheet

(51) Int. Cl.
   *B29C 45/14*     (2006.01)
   *B29C 59/00*     (2006.01)
   *B29K 77/00*     (2006.01)

(52) U.S. Cl.
   CPC ........ *B29C 59/005* (2013.01); *B29K 2077/00*
           (2013.01); *B29K 2995/004* (2013.01)

(58) Field of Classification Search
   CPC ............. B29C 45/14811; B29C 45/372; B29C
           45/14688; B29C 37/0032; B29C 37/0053;
           B29K 2077/00; B29K 2995/004; C08L
                                      77/06
   See application file for complete search history.

(56)                References Cited

U.S. PATENT DOCUMENTS

| | | | |
|---|---|---|---|
| 2013/0216782 A1 | 8/2013 | Yamashita et al. | |
| 2013/0342977 A1 | 12/2013 | Chang et al. | |
| 2019/0300707 A1* | 10/2019 | Malet ...................... | C08F 36/08 |
| 2020/0290244 A1* | 9/2020 | Dyckmans ........... | B29D 35/128 |
| 2022/0040907 A1* | 2/2022 | Beenken ................ | B29C 59/02 |

FOREIGN PATENT DOCUMENTS

| | | | |
|---|---|---|---|
| JP | 2008503631 A | 2/2008 | |
| JP | 2012515243 A | 7/2012 | |
| JP | 2013173364 A | 9/2013 | |

* cited by examiner

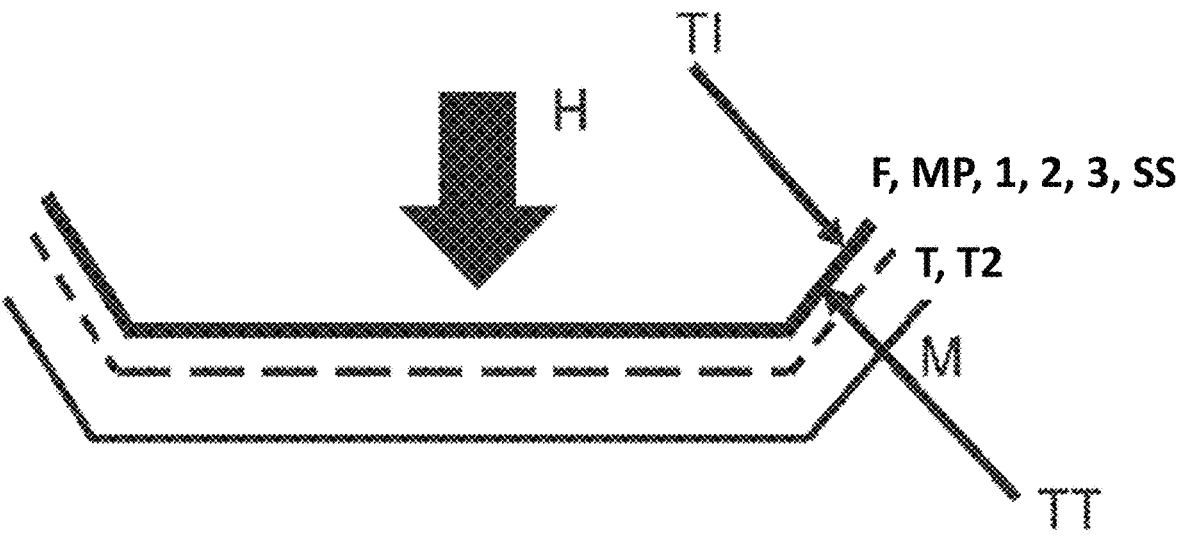

METHOD FOR TEXTURING A POLYAMIDE

The present invention relates to a method for preparing an object comprising or consisting of a film comprising at least one layer (1) comprising a composition comprising at least one semi-crystalline polyamide (Psc), said film having on all or part of at least one of its surfaces the texture of a texturing element (T).

It also relates to the objects obtained by said method as well as to the parts comprising at least one object obtained by said method.

In other words, the present invention relates to a method for texturing a film of semi-crystalline polyimide (Psc) in order to obtain a specific surface finish of said film of semi-crystalline polyamide (Psc), i.e. to obtain the ability to clone the relief and/or the feel of any materials (texturing agent) for example such as a more or less soft fabric, leather, paper, wood, a plant such as a tree leaf, etc. in order to produce a part or a product having advantageous visual and tactile features.

It is known that plastic materials are generally considered to be materials of mediocre quality compared with more traditional materials such as metals, fabrics, wood, leather, etc.

However, the cost of certain materials such as leather or wood for uses especially in motor vehicles or as parquet flooring in homes is becoming increasingly high and prohibitive.

Thus, in the context of motor vehicles, a dashboard or the interior of a motor vehicle door consisting of leather or wood is inconceivable in the context of low-range or mid-range vehicles.

Likewise, parquet flooring made of oak or consisting of exotic species in apartments is currently much too high an investment.

Nevertheless, imitations, especially plastic, of these objects (dashboard, door interior, parquet, etc.) are too often disappointing in their rendering and/or quality. It is further known that plastic materials have difficulty in rendering complex surface finishes.

Documents US2013/342977 and US2013/216782 both describe a method of making an object by injection-molding which comprises a film (PET and polyolefin-based resin respectively) having the texture of a structuring element. Nevertheless, the molding conditions are not disclosed in these two documents.

A method for making such objects is especially disclosed in application WO06/008358 which relates to microcrystalline polyamides that make it possible to have an upper face that is well able to take on the grain and to render the surface finishes of a mold, that is able to become smooth and shiny (in contact with a sufficiently hot polished metal mold wall) or to become matt and grained (in contact with a sufficiently hot matt or grained metal mold wall), or to take on a brushed aspect.

This method does not however make it possible to reproduce just any surface finish.

Alternatively, this application provides for texturing walls of the mold (or any other texturing device) which consist of a material other than metal and are intended for being capable of rendering very complex surface finishes of non-metallic materials such as fabrics, paper, leather, wood, plants, etc.

However, the essential information in the disclosure of this application is to a large extent absent for making it possible to obtain objects that have the aspects as mentioned in this application.

Plastic materials are either solid and too rigid to sufficiently take on the relief, or they are in a liquid state and adhere excessively to the surface, and it is then impossible, once the plastic has re-solidified, to detach it from the texturing wall (for example made of fabric).

The present invention therefore makes it possible to solve this problem of essential features that are not sufficiently described or not present.

The present invention thus relates to a method for preparing an object comprising at least one film comprising at least one layer (1) comprising a composition comprising at least one semi-crystalline polyamide (Psc), said composition, or optionally said semi-crystalline polyamide having a melt enthalpy of between 25 J/g and 75 J/g (first DSC heating according to ISO 11357-3:2013 at 40° C./min), said film having on all or part of at least one of its surfaces the texture of a texturing element (T), characterized in that it comprises the following steps:

a. Providing a mold (M) set to a temperature less than or equal to 120° C., in particular between 20° C. and 90° C., b. Applying to the wall of the mold, at least one texturing element (T), preferably with a thickness between 20 and 2000 µm, preferentially between 50 µm and 1000 µm, in particular between 50 µm and 500 µm, in particular in planar form, and having at least partially a textured surface, said textured surface being on the face opposite that facing the mold, c. Applying to the textured surface of said texturing element (T), at least one film (F) comprising at least one layer (1) comprising a composition (CPO) comprising at least one semi-crystalline polyamide (Psc), said layer (1) being intended for being in contact with the textured surface of the texturing element (T), the thickness of said layer (1) being at least 10 µm, in particular between 10 and 1000 µm, d. Applying at least one heating means (H) to said film of step (c), in order to arrive at a temperature (TT) on the side of the film facing the texturing agent (T), between Tg and the melting temperature (Tm) of the composition (CPO) minus 15° C., the Tm being measured according to ISO 11357-3:2013, and applying a pressure means (P) to said film in order to bring it into contact with the texturing element (T), with a pressure between 1.5 and 2000 bars, in particular between 5 bars and 1000 bars, for a time t between 0.1 s and 5 h, preferentially between 3 s and 10 min, e. Removing from the mold and obtaining the object comprising said semi-crystalline polyimide film (Psc) and having on all or part of at least one of its surfaces the texture of said texturing element (T).

The mold can have any shape and especially has a concave or convex shape, preferentially a concave shape and can consist of any material as long as such material is able to withstand the temperature used in the method of the invention and thus especially at least 120° C. as well as at least the maximum service pressure used in the method and thus at least 200 bars.

The mold in step a is set beforehand to a temperature less than or equal to 120° C., especially less than or equal to 100° C., in particular less than or equal to 90° C., preferentially between 20° C. and 90° C.

The expression "mold set to a temperature . . . " has the same meaning as the "mold is previously at a temperature . . . " and means that in the case of an injection press, the temperature of the mold corresponds to the temperature of the heat-transfer fluid circulating inside the mold. It thus consists of said heat-transfer fluid of the setpoint temperature. It is also the temperature that the operator (skilled person) selects by adjustment via the control panel of the machine (injection press).

In the case of a mold of "compression mold" or "waffle mold" type, it corresponds to the temperature of the wall of the mold on the surface on the texturing side.

At least one texturing element (T) is subsequently, in step b, applied or introduced onto or against the wall of the mold, said mold being preferably at the same temperature as that defined for step a.

In the case of an injection mold, the wall of the mold is the inner wall of the mold, that is the wall of the mobile part of the mold (as opposed to the wall of the stationary part of the mold, where the injection point is located.

The expression "texturing element (T)" designates any material having at least one surface at least partially structured but flattened and making it possible to reproduce its texture, i.e. its surface finish or property and/or feel, for example rough or smooth).

The surface of said texturing element (T) can be only partially structured on one and/or the other of its surfaces.

Preferentially, one of the surfaces of said texturing element (T) is entirely structured.

Preferentially, the two surfaces of said texturing element (T) are at least partially structured.

If the texturing element (T) is only structured on one of its surfaces, then the face opposite the mold, on the inside of the mold is the non-structured side.

Preferentially, the two surfaces of said texturing element (T) are entirely structured.

The texturing element (T) may be of animal or plant origin, for example it is selected from wood, a fabric, leather, paper, a plant like a tree leaf.

It is obvious that the structured element is flexible enough to match the shape of the mold, especially at the temperature of the mold.

Otherwise, the texturing element (T) can be thermoformed previously before being disposed in the mold.

Advantageously, a single texturing element (T) is applied to the wall of the mold (M).

Advantageously, the texturing element (T) is in particular in planar form, more particularly in the form of a film with a thickness between 20 and 2000 μm, preferentially between 50 μm and 1000 μm, in particular between 50 μm and 500 μm, having at least partially a textured surface.

Beyond 2000 μm, the film is too thick to be able to correctly match the shape of the mold.

Step c consists of applying to the texturing element (T), on the face opposite that facing the mold and thus on the side of the structured face if the texturing element (T) only has one, a film (F) comprising at least one layer (1) comprising a composition comprising at least one semi-crystalline polyamide (Psc) as defined hereinbefore.

The expression "a composition comprising at least one semi-crystalline polyamide (Psc)" means that the semi-crystalline polyamide is the majority component with respect to the sum of the polymers of said composition.

Said layer (1) is thus intended for being in contact with the texturing element, especially with the structured surface of the texturing element (T) if the texturing element (T) only has one.

In the case of the film (F)

The expression "application of at least one heating means" means that as a function of the thickness of the film, one or more heating means are present.

Thus, in the case of a film (F) with a thickness between 10 and 400 μm, a single heating means may be necessary, said heating means consisting for example in the injection of a molten polymer.

In the case in which the film (F) has a thickness greater than 400 μm, it is advantageous to preheat said film (F) and thus to have a second heating means different from said heating means.

Said second heating means is then for example a mobile heating strip, in particular a mobile infrared (IR) heating strip for preheating the film. In this case, advantageously, a negative pressure of at least −700 mbars of relative vacuum is applied to said film (F) via a vacuum pumping system in order to flatten it as well as said texturing agent (T) against the wall of the mold intended for being in contact with the texturing agent (T).

The film (F) can be single-layer (F1) or multilayer (F2),

The film (F) can be decorated beforehand (advantageously on the face not exposed to future aggressions) which would make it possible ultimately to obtain a film that is decorated in a visual and tactile manner.

In the case of a single-layer film (F1), said film (F1) consists of one layer (1) comprising a composition (CPO) comprising at least one semi-crystalline polyamide (Psc), said layer (1) having a thickness of at least 10 μm, in particular between 10 and 2000 μm.

Thus there is no other layer present in the film (F1), said layer (1) being optionally decorated.

Advantageously, said layer (1) consists of said composition (CPO).

In the case of a multilayer film, said film (F2) comprises at least one layer (1) comprising a composition comprising at least one semi-crystalline polyamide (Psc), said layer (1) having a thickness between 20 and 1000 μm, in particular between 50 and 200 μm.

Advantageously, said layer (1) of said single-layer film (F1) or of said multilayer film (F2) consists of a composition comprising at least one semi-crystalline polyamide (Psc).

Said composition can thus comprise several semi-crystalline polyamides. Said composition of the layer (1) is then mostly based thereon, said semi-crystalline polyamides (Psc) being the matrix components.

Advantageously, said composition comprises a single semi-crystalline polyamide, said semi-crystalline polyamide (Psc) being the matrix component.

Said composition of the layer (1) can be an alloy, a blend, a composite.

It can comprise additives conventionally used by a skilled person, especially plasticizers, stabilizers, colorants, mineral fillers, and other polymers that are miscible, compatible, or compatibilized by a third-party component.

The composition (CPO), and optionally said at least one semi- crystalline polyamide (Psc)), has a melt enthalpy of between 25 J/g and 75 J/g (first DSC heating according to ISO 11357-:2013 at 40° C./min).

Preferably the composition (CPO) (and optionally said at least one semi-crystalline polyamide (Psc)) is such that its Tg (glass-transition temperature) is between 30 and 120° C., preferably between 60° C. and 90° C., and that its Tm (melting temperature) is between 150° C. and 330° C., preferably between 150 and 200° C.

Advantageously said at least one polyamide (Psc) is the result of chaining monomers such that 50% or more, by weight, of these monomers have a number of carbon atoms greater than or equal to 9, advantageously, the number of carbon atoms of the monomers is comprised between 9 and 36, preferentially between 9 and C18, more preferentially between 9 and 12

Advantageously, the semi-crystalline polyamide (Psc) is selected from PA 12 and PA 11, in particular PA 11.

Semi-crystalline polyamide (Psc) is also understood to mean copolyamides.

If the film is multilayer, then the layer which is in contact with the structured surface of the element (T) is the layer (1) defined hereinbefore.

The thickness of the layer (1) of the single-layer film (F1) or of the multilayer film (F2) is greater than or equal to 10 µm.

Advantageously, it is comprised between 10 and 1000 µm, especially between 100 and 1000 µm.

More preferentially, it is comprised between 10 and at least 500 µm, especially between 10 µm and at least 200 µm.

Step d of the method defined hereinbefore, consists in applying a heating means (H) to the face opposite that in contact with the element (T) of said film (F) of step c, so that the layer (1), which is intended for being in contact with the texturing element (T), is at a temperature (TT) on the side of the film facing the texturing agent (T), between 60° C. and a temperature Tm–15° C., Tm being the melting temperature of the composition (CPO), composition which comprises said semi-crystalline polyamide (Psc).

TT corresponds to the temperature on the surface of the film (side of the film facing the texturing agent (T)).

Advantageously, Tg<TT<Tm–30° C.

More advantageously, Tg<TT<Tm–50° C.

In another variant, Tg+10° C.<TT<Tm–15° C., advantageously, Tg+10° C.<TT<Tm–30° C., more advantageously Tg+10° C.<TT<Tm–50° C.

In yet another variant, Tg+20° C. <TT<Tm–15° C., advantageously, Tg+20° C.<TT<Tm–30° C., more advantageously Tg+20° C.<TT<Tm–50° C.

Advantageously, said layer (1) is at a temperature (TT) between 60° C. and 150° C., preferentially between 60° C. and 100° C.

The temperature of the layer (1) of said film (F) intended for being in contact with the texturing element (T) can be measured by techniques that are conventional for a skilled person.

The temperature (TT) can be measured for example with a sensor in the bottom of the mold that is flush making it possible to obtain the temperature without the presence of the texturing element (T).

Step d also consists in applying a pressure means (P) to said film (F) with a pressure between 1.5 and 2000 bars, in particular between 5 and 1000 bars.

Advantageously, the pressure (P) is between 5 bars and 500 bars, for a time t between 0.1 s and 5 h, preferentially between 1 s and 1 h min, more preferentially between 1 s and 10 min, especially between 3 s and 10 min, in particular between 3 s and 2 min.

The application of the pressure means (P) is carried out simultaneously with or after the application of the heating means (H).

The time t during which the heating means (H) and the pressure means (P) are applied to the film (F) is comprised between 0.1 s and 5 h, preferentially between 3 s and 10 min.

The application of said heating means and said pressure means makes it possible to place the layer (1) of said film (F) in contact with said texturing element (T), which makes it possible for said texturing element (T) to penetrate far enough into the layer (1) that the composition CPO can take on the impression of the texturing element (T) but not to the point of melting the composition CPO and thus of bonding excessively to the texturing element (T).

After removal from the mold, the object comprising said film (F) of semi-crystalline polyimide (Psc) and having, in all or part of the outer and/or inner surface of said layer (1), the reproduction of the texture of the texturing element (T) is obtained in step e.

After removal from the mold, said film (F) lacks the texturing element (T) since it does not adhere and/or detaches easily.

The reproduction of the texture of the texturing element (T) is carried out partially on the surface of the film (F) which was in contact with the texturing element if the surface of said texturing element (T) is only partially structured.

It is carried out on the entire surface of the film (F) if the surface of said texturing element (T) is totally or entirely structured.

Advantageously, the surface of said texturing element (T) is totally or entirely structured and the reproduction of the texture of the texturing element (T) is carried out on the entire surface of the single-layer film (F).

In one advantageous embodiment, said temperature of the layer (1) of said film comprising the composition (CPO) intended for being in contact with said texturing element (T), is at a temperature (TT) as defined hereinbefore, over a thickness of at least 10 µm.

TT then corresponds to the temperature no longer on the surface of the film (on the side of the film facing the texturing agent (T)), but over a thickness (or depth) of at least 10 µm.

Advantageously, the temperature of the layer (1) of said film comprising the composition CPO intended for being in contact with said texturing element (T), is at a temperature (TT) as defined hereinbefore, over a thickness between 10 and less than 500 µm, especially between 10 µm and less than 200 µm.

Advantageously, the temperature of the layer (1) of said film comprising the composition (CPO) on the side opposite the surface intended for being in contact with said texturing element (T), is greater than or equal to Tm of (CPO) –25° C., over 20% of the thickness of said layer (1).

The heating and pressure means of step d may be any heating and pressure means known to a skilled person, such as an infrared or microwave strip chamber.

Advantageously, said heating (H) and pressure means (P) consists in injecting a molten polymer (I) at a temperature Tinj between 150° C. and 350° C. onto the face opposite that intended for being in contact with the texturing element (T) of said film (F) of step (c), for a time t between 0.1 s and 15 min, preferentially between 1 s and 15 min, more preferentially between 1 s and 10 min, especially between 3 s and 10 min, in particular between 3 s and 2 min and the pressure being between 1.5 and 2000 bars, in particular between 5 bars and 1000 bars, more advantageously between 50 bars and 500 bars.

The molten polymer thus constitutes both the heating and pressure means.

The injection of the molten polymer (I) as heating means thus makes it possible to bring the face of the film (F) which is in contact with said molten polymer to a temperature (TI) and by diffusing the heat through said film (F) to bring the face of the film (F) that is in contact with the structuring element (T) to a temperature TT, which as a result is less than TI.

In the case of an injection press, the molten polymer (I) is injected into the mold (onto the film (F)) with a flow rate preferentially between 10 and 1000 cm³/s.

In a first variant, when said heating and pressure means consists in injecting a molten polymer (I), said molten polymer (I) adheres to said layer (1).

Advantageously, in this first variant, the film comprising the composition (CPO) is a single-layer film (F1) with a thickness as defined hereinbefore.

In the case of a single-layer film (F1), depending on the thickness of the film, the texturing element (T) can also be reproduced on the inner surface of said layer (1) of the single-layer film (F1).

The application of said heating means and of said pressure means by the injection of a molten polymer (I) makes it possible to place the layer (1) of said single-layer film (F1) in contact with said texturing element (T), which makes it possible for said texturing element (T) to penetrate far enough into the layer (1) of said single-layer film so that this film (F1) (comprising the composition (CPO)) can take on the impression of the texturing element (T) but not to the point of melting the composition (CPO) and thus of bonding excessively to the texturing element (T).

At the same time, the polymer (I) adheres sufficiently to said layer (1) of said film (F1) but the temperature in molten state of (I) is not too high so as not to melt or partially melt the film such that it is not too damaged or deformed.

Advantageously, the temperature in molten state of (I) Tinj is between Tm+20° C. and Tm+100° C.

In one embodiment, the thickness of said single-layer film (F1) is between 100 µm and 1000 µm, in particular between 10 and less than 500 µm, especially between 10 µm and less than 200 µm.

Advantageously, the temperature of the layer (1) of said single-layer film (F1) comprising the composition (CPO) intended for being in contact with said texturing element (T), is at a temperature (TT) as defined hereinbefore, over a thickness between 10 and less than 500 µm, especially between 10 µm and less than 200 µm.

Advantageously, the temperature of the layer (1) of said film comprising the composition (CPO) on the side opposite the surface intended for being in contact with said texturing element (T), is greater than or equal to Tm−25° C., over 20% of the thickness of said layer (1) of said single-layer film (F1).

The polymer (I) in molten state can be any thermoplastic polymer as long as it is able to be in molten state between 150° C. and 350° C.

Advantageously, the temperature of the polymer (I) in molten state is between 200° C. and 280° C. and the polymer is a polymer adhering the layer (1) of said film (F1), in particular this is a polyamide composition based on more than 50% of polyamide with a number of carbons greater than or equal to 9.

In one embodiment, the polymer in molten state (I) is selected from compositions based on polymers such as polyether block amides (PEBA), polyurethane thermoplastics (TPU), polyethylenes (PE), polypropylenes (PP), acrylonitrile butadiene styrenes (ABS), polycarbonates (PC), PA610, 612, 11, 12. C9 PAs and copolyamides, PA alloys, polyphthalamides, transparent amorphous PAs, poly(methyl methacrylate) (PMMA), so as to obtain good adhesion between the polymer in molten state and the layer (1) of the film (F1).

Advantageously, the polymer (I) is a polyamide, especially an aliphatic polyamide and especially selected from PA11, PA12, PA1012, PA1010, PA612 and PA610, in particular from PA11 and PA12, especially the polymer (I) is a PA11.

According to the present application, the term "polyamide", also denoted PA, excluding the definition of the semi-crystalline polyamide (Psc) of the layer (1) of the film (F) relates to:

homopolymers (or homopolyamides), copolymers, or copolyamides, based on different amide units, polyamide alloys, provided that polyamide is the major constituent.

There is also a category of copolyamides in the broad sense, which, although not preferred, forms part of the scope of the invention. These are copolyamides comprising not only amide units (which will be in the majority, and so they are to be considered as copolyamides in the broad sense), but also units of non-amide nature, for example ether units. The best known examples are PEBA or polyether-block-amide, and their copolyamide-ester-ether, copolyamide-ether or copolyamide-ester variants. Among these, mention may be made of PEBA-12 where the polyamide units are the same as those of PA12, PEBA-612 where the polyamide units are the same as those of PA612.

The nomenclature used to define the polyamides is described in ISO standard 1874-1:1992 "Plastics—Polyamide (PA) molding and extrusion materials—Part 1: Designation", in particular on page 3 (tables 1 and 2) and is well known to the skilled person.

In a second variant, when said heating and pressure means consists in injecting a molten polymer (I), said molten polymer (I) lacks adhesion to said semi-crystalline polyamide (Psc).

Advantageously, in this second variant, said film of semi-crystalline polyamide (Psc) is a multilayer film (F2) comprising at least one layer (1) with a thickness between 20 µm and 1000 µm, in particular between 50 µm and less than 200 µm and at least one layer (2) able to adhere to the molten polymer (I).

Advantageously, the polymer (I) is a polyamide, especially an aliphatic polyamide and especially selected from PA11, PA12, PA1012, PA1010, PA612 and PA610, in particular from PA11 and PA12, especially the polymer (I) is PA11.

Thus in this second variant, there is a first embodiment characterized in that said multilayer film (F2) comprises at least two layers, a layer (1) and a layer (2), the two layers (1) and (2) adhering to one another, and the layer in contact with the texturing element (T) being the layer (1) comprising the composition comprising said semi-crystalline polyamide (Psc).

In this case, the layer (2) may comprise a composition comprising a polyamide, especially aliphatic, in particular a copolyamide, especially PA11/6 which adheres to the layer (1).

It is obvious that the layers (1) and (2) are not identical.

The polymer (I) in molten state can be any thermoplastic polymer as long as it is able to be in molten state between 150° C. and 350° C.

Advantageously, the temperature of the polymer in molten state is between 200° C. and 280° C. and the polymer is a polymer adhering the layer (1) of said film (F1), in particular this is a polyamide composition based on more than 50% of polyamide with a number of carbons greater than or equal to 9.

In one embodiment, the polymer in molten state is selected from polyether block amides (PEBA), polyurethane thermoplastics (TPU), polyethylenes (PE), polypropylenes (PP), acrylonitrile butadiene styrenes (ABS), polycarbonates (PC), PA610, 612, 11, 12, C9 PAs and copolyamides, PA alloys, polyphthalamides, transparent amorphous PAs, poly (methyl methacrylate) (PMMA), so as to obtain good adhesion between the polymer in molten state and the layer (2) of the film (F2).

Advantageously, the layer (2) consists of a composition comprising a polyamide, especially aliphatic, in particular a copolyamide, especially PA11/6 which adheres to the layer (1).

Said composition may be as for the layer (1) an alloy, a blend, a composite.

It can comprise additives conventionally used by a skilled person, especially plasticizers, stabilizers, colorants, mineral fillers, and other polymers that are miscible, compatible, or compatibilized by a third-party component.

Advantageously, said molten polymer (I) defined hereinbefore adheres to the layer (2), said layer (2) being located on the side opposite the layer (1) which is in contact with the texturing element (T).

Advantageously, said molten polymer (I) defined hereinbefore adhering to the layer (2) is a polyamide, in particular aliphatic, especially one having an average number of carbon atoms per nitrogen atom between 5 and 7.

The application of said heating means and of said pressure means by the injection of a molten polymer (I) makes it possible to place the layer (1) of said multilayer film (F2) in contact with said texturing element (T), which makes it possible for said texturing element (T) to penetrate far enough into the layer (1) of said multilayer film so that it can take on the impression of the texturing element (T) but not to the point of melting the composition (CPO) and thus of bonding excessively to the texturing element (T).

At the same time, the polymer (I) adheres sufficiently to the layer (2) of said film (F2) but the temperature in molten state of (I) is not however too high so as to avoid overly deforming the layer (2) of said film (F2) by creep.

In this second variant, there is a second embodiment characterized in that said multilayer film (F2) comprises at least two layers (1) and (2), the layer in contact with the texturing element (T) being the layer (1) comprising the composition (CPO), the two layers (1) and (2) lacking adhesion to one another and comprising at least one third layer (3) between them enabling the adhesion between the layers (1) and (2).

Layer (3) may be an adhesive composition, especially a composition based on at least one polyamide and in particular the following composition;
- at least one polyamide denoted A having an average number of carbon atoms per nitrogen atom denoted CA between 4 and 8.5, advantageously between 4 and 7;
- at least one polyamide denoted B having a melting temperature greater than or equal to 180° C. and an average number of carbon atoms per nitrogen atom denoted CB between 7 and 10, advantageously between 7.5 and 9.5;
- at least one polyamide denoted C having an average number of carbon atoms per nitrogen atom denoted CC between 9 and 18, advantageously between 10 and 18;
at least 50% by weight of said composition being formed of one or more polyamides selected from the polyamides A, B and C,
the weighted average mass of the melting enthalpies of these polyamides inside said composition being greater than 25 J/g (DSC), the average number of carbon atoms per nitrogen atom of the polyamides A, B and C further satisfying the following strict inequation; CA<CB<CC.

Advantageously, said molten polymer (I) defined hereinbefore adheres to the layer (2), said layer (2) being located on the side opposite the layer (3) which is in contact with the layer (1) in contact with the texturing element (T).

Said layer (2) is thus in contact with layer (3) which allows the adhesion of layer (1) and of layer (2).

The application of said heating means and of said pressure means by the injection of a molten polymer (I) makes it possible to place the layer (1) of said multilayer film (F2) in contact with said texturing element (T), which makes it possible for said texturing element (T) to penetrate far enough into the layer (1) of said multilayer film so that it can take on the impression of the texturing element (T) but not to the point of melting the composition (CPO) based on polyamide (Psc) and thus of bonding excessively to the texturing element (T).

At the same time, the polymer (I) adheres sufficiently to the layer (2) of said film (F2) but the temperature in molten state of (I) is not too high so as to avoid deforming the layer (2) of said film (F2) by creep.

Advantageously, said molten polymer (I) defined hereinbefore adhering to the layer (2) is a polyamide, in particular aliphatic, especially having an average number of carbon atoms per nitrogen atom between 5 and 7.

In one embodiment, the layer (1) intended for being in contact with said texturing element (T), during step d, is at a temperature (TT) of the composition of the layer (1), and preferably between the Tg and the Tm−15° C. of said semi-crystalline polyamide (Psc)) over a thickness between 5 and 50% of said film, on the side facing the texturing agent (T), the Tg being determined according to ISO 11357-2:2013 and the Tm according to ISO 11357-3:2013.

Below a thickness of 5%, the layer (1) of said film is not at a sufficient temperature to be able to reproduce the structuring surface of the texturing element (T).

Above a thickness of 50%, the temperature of said film is too low over a considerable thickness for good adhesion between the layer (1) and the molten polymer (I) of the single-layer film (F1) or the layer (1) and (2) of the multilayer film (F2) or the layers (1), (3) and (2) of the multilayer film (F2) or even between the layer (2) and the molten polymer (I) of the multilayer film (F2). Advantageously, the composition of the layer (1) has a transparency such that the transmittance at 560 nm on a plate with a thickness of 1 mm is greater than or equal to 80% determined according to standard ISO 13468-2:2006, in particular greater than or equal to 88%.

Advantageously, the composition of the layer (1) and optionally also said semi-crystalline polyamide (Psc) has/have a melt enthalpy of between 30 and 50 J/g (first DSC heating according to ISO 11357-3:2013 at 40° C./min).

Advantageously, the composition of the layer (1) has a transparency such that the transmittance at 560 nm on a plate with a thickness of 1 mm is greater than or equal to 80% determined according to standard ISO 13468-2:2006, in particular greater than or equal to 88% and the melt enthalpy is between 30 and 50 J/g (first DSC heating according to ISO 11357-3:2013 at 40° C./min).

In one embodiment, the composition (CPO) (and optionally said at least one semi-crystalline polyamide (Psc)) is such that its glass-transition temperature (Tg) is between 30 and 120° C., preferably between 60° C. and 90° C. determined according to ISO 11357-2:2013, and its melting temperature (Tm) is between 150° C. and 330° C., preferably between 150° C. and 200° C., determined according to ISO 11357-3:2013.

Advantageously, the layer (1) of said single-layer (F1) or multilayer (F2) film consists of a transparent composition comprising by weight, the total being 100%:

5 to 40% of an amorphous polyamide (B) which results essentially from the condensation:
    either of at least one diamine selected from the cycloaliphatic diamines and the aliphatic diamines and of at least one diacid selected from the cycloaliphatic diamines and the aliphatic diacids, at least one of these diamine or diacid units being cycloaliphatic,
    or of a cycloaliphatic alpha omega amino carboxylic acid,
    or of a combination of these two possibilities,
and optionally of at least one monomer selected from the alpha omega amino carboxylic acids or the optional matching lactams, the aliphatic diacids and the aliphatic diamines, 0 to 40% of a flexible polyamide (C) selected from the polyamide and polyether block copolymers and copolyam ides,
    0 to 20% of a compatibilizing agent (D) of (Psc) and (B),
    0 to 40% of a flexible modifier (MS),
    0 to 20% of an additive (A),
with the condition that (C)+(D)+(MS) is between 0 and 50%,
    the remainder to 100% of a semi-crystalline polyamide (Psc), the polyamide (Psc) being the majority component with respect to the sum of (Psc)+(B)+(C)+(D).

Advantageously, the layer (1) of said single-layer (F1) or multilayer (F2) film consists of a transparent composition comprising by weight, the total being 100%:

5 to 40% of an amorphous polyamide (B) which results essentially from the condensation of at least one diamine, optionally cycloaliphatic, of at least one aromatic diacid and optionally of at least one monomer selected from:
    the alpha omega amino carboxylic acids,
    the aliphatic diacids,
    the aliphatic diamines,
    0 to 40% of a flexible polyamide (C) selected from the polyamide and polyether block copolymers and copolyamides,
    0 to 20% of a compatibilizing agent (D) of (Psc) and (B),
    0 to 20% of an additive (A),
(C)+(D) is comprised between 0 and 50%
with the condition that (B)+(C)+(D) is not less than 30%,
    the remainder to 100% of a semi-crystalline polyamide (Psc), the polyamide (Psc) being the majority component with respect to the sum of (Psc)+(B)+(C)+(D).

Advantageously, the polyamide (Psc) is selected from PA11, PA12, PA1012, PA1010, PA612 and PA610, in particular from PA11 and PA12, in particular the polyamide (Psc) is PA11.

In another embodiment, a second texturing element (T'), different from the first is present between the first texturing element (T) and the mold, said second texturing element (T') at least partially covering said first texturing element (T).

It can be for example a logo of a company which manufactures said object as defined hereinbefore. In this case, it is obvious that the second texturing element (T') only partially covers said first texturing element (T).

In one embodiment, optionally, said object obtained in step e., as defined hereinbefore, coats with its non-textured side, a structural substrate.

The term "coats" also means "covers", "dresses", "overlaps", "upholsters" or "garnishes".

According to another aspect, the present invention relates to an object obtained according to the method as defined hereinbefore.

According to another aspect, the present invention relates to a part comprising at least one object as defined hereinbefore.

The part can be an interior of a motor vehicle (door, console, etc.). It can also be a "wooden panel" part which is a panel of wood (or the like) covered with a film as defined hereinbefore with a wood image (decoration by sublimation or screen printing) and a wood feel (by means of a texturing agent such as wood in a warm state), while having the endurance of a polyamide such as PA11, in one word wood with all of its benefits and none of its defects.

BRIEF DESCRIPTION OF THE FIGURES

FIG. 1 describes a general diagram of the method of the invention with the mold (M), the texturing element (T), which may include a second texturing element (T2), the film (F), which may be formed from molten polymer (MP), and include layer (1), layer (2) , layer (3), and structual substrate (SS), the pressure means (H) and the temperatures (TI) and (TT), (TI) being the temperature on the surface of the film on the side opposite that which is to be textured, (TT) being defined beforehand.

EXAMPLES

Example 1: Representative General Method with a Single-Layer Film

Example 1-a: Fabric Texturing Agent

A 350-ton injection press is used, the temperatures of the injection screw being set to 250° C. in the last heating zone of the screw. A polyamide PA12 with inherent viscosity 1.0, measured in m-cresol according to standard ISO 307:2007 but using m-cresol instead of sulfuric acid, a temperature of 20° C. and a concentration of 0.5% by weight, is injected into a mold (M) corresponding to an interior panel of a rear car door.

Step (a)

The mold is first set to 60° C.

Like all injection molds, this mold consists of 2 parts:

The stationary part, the part closest to the injection screw, which is also the part in which the injection point(s) are located, The mobile part of the mold, the part which allows the mold to be opened, this part is the furthest from the injection screw.

This part is typically that which makes it possible to mold the front face of the part (which will be visible: interior panel of a car). This part of the mod is that which concerns the mold (M).

Step (b)

Instead of immediately injecting the polymer into the mold as during a conventional injection cycle, a texturing agent (T) which is a piece of fabric with a planar shape and has a thickness of around 0.5 mm is placed at the bottom of the mold (M) (thus in its mobile part). The fabric is cut so that it can upholster the entire surface of the mobile part of the mold (M).

Step (c)

A single-layer film (or sheet) (F) comprising a composition CPO with a thickness of 150 μm, this composition consisting of:

65% by weight of PA12 Mw 45000 to 55000,

25% by weight of a CoPA IPD.10/12 (weight ratio: 80/20),

10% of PA 11 with Mw 45000 to 55000 and containing 0.3% of phosphoric acid, is placed in the mold and above the fabric (texturing agent T), The film has been previously obtained by implementation on a conventional film-calendering line consisting of an extruder heated to 240° C., the molten polymer at the output of the extruder being shaped into a film by the action of calendering rollers heated to 40° C.

The film is also cut so that it projects by several mm from the joint plane so that it can, later in the injection process, at least cover the entire surface of the mold.

Step (d)

The mold is then closed and the PA12 with inherent viscosity 1.0 is injected into the mold with a flow rate of 385 cm³/s and the injection screw is set to a ceiling temperature of 250° C. Once the mold is filled, the pressure is applied and maintained for a time of 10 s, this pressure being 250 bars. This pressure presses the film (F) onto the texturing agent (T), the two being pressed against the bottom of the mold (M). The film (F) and the texturing agent (T) match the shape of the mold and the film (F) matches and reproduces the texture of the texturing agent (T).

Then the mold is left to cool, with a cooling time of 40 s, which is the end of step (d).

Step (e)

After cooling, the mold is opened.

The object "interior panel of rear car door", which is retrieved consists of PA12 (now in solid state with a thickness of 1.5 mm) covered with the film (F). The film (F) is rigidly connected to the part made of PA12 since the adhesion between them is good.

The texturing agent (T) does not adhere to the film (F), it falls off by itself or can be easily removed by hand. The texturing agent T has left its impression on the visible side (outer side) of the film F, and in this way it reproduces its aspect and most particularly its feel, which grants the object "interior panel of rear car door", an aspect which is no longer that of a typical plastic object, but rather that of a high-quality object that appears to be upholstered or covered with an actual fabric.

Example 1-b

One variant of example 1 consists of the prior visual decoration of the film (F), (after its production by calendering and before placing it in the mold of the injection press), by a sublimation or screen-printing technique consisting of transferring an image, a visual decoration, onto the face of the film (F) which is preferably the face opposite the face intended for being textured. The image may be one that corresponds to a photograph of the fabric that constitutes the texturing agent (T).

1-b-1

The texturing agent may be for example a colored printed fabric. Thus not only the feel of the texturing agent but also its visual aspect will have been reproduced on the object, because the film (F) was decorated (visually) beforehand with an image of this fabric. Thus the visual and tactile aspect of the fabric texturing agent will have been reproduced. Thus, a more complete haptic sensation will be obtained. The advantage with respect to an actual fabric is the endurance of the film (F), which is physically and chemically much greater than that of a fabric (textile).

1-b-2

There may also be visual wood decoration on the film and for this purpose a texturing agent which is a thin sheet of wood is used.

The result is an object that resembles wood in visual and tactile terms.

Example 1-c

For even greater endurance, we can consider the example of a film of 600 μm instead of 150 μm. This thickness can make it more difficult to match the shape of the mold. In order to make it better match the shape of the mold the thick film can be previously shaped so as to coarsely pre-match the shape of the mold. For this purpose, after having placed and attached the texturing agent (T) and the film (F), that is after step (c) and before closing the mold in order to inject the PA12, a step that consists of providing an infrared heating strip for heating the film (F) above its Tg, that is 100° C. (measured by an infrared thermometer) during at least 3 s is carried out and then using a vacuum pump a negative pressure is applied to the bottom of the mold so as to suck the softened film (F) onto the bottom of the mold, at least coarsely or partially.

The process then resumes its course, the mold is closed, the molten PA12 is injected and it can finish pushing the film onto the bottom of the mold so that it perfectly matches it, as already described, in the process, it will match the texturing agent (T) and reproduce its texture.

Example 1-d

Texturing agent: blotting paper.

Example 1-a is reproduced using a blotting paper texturing agent with a thickness of 0.3 mm.

Example 1-e

Texturing agent: Plant such as a tree leaf

Example 1-a is reproduced using a tree leaf texturing agent with a thickness of around 6 mm in the thickest parts.

Example 1-f

Two texturing agents: Plant such as a tree leaf on blotting paper

Example 1-a is reproduced using a tree leaf texturing agent of example 1e with a second blotting paper texturing agent.

The tree leaf (texturing agent no. 1) is located above the blotting paper (texturing agent no. 2), the tree leaf being placed on the face of the film. Thus the reproduction of the tree leaf on a blotting paper background is obtained.

Example 2: Representative General Method with Multilayer Film Comprising a Layer (1) and a Layer (2)

Example 2-a: Adhering Layer (1) and Layer (2)

Example 1-a is reproduced with the difference that in step (c), a multilayer film (F) comprising a layer (1) comprising a composition CPO as defined in example 1, but with a thickness of 50 μm and a layer (2) consisting of pure polyimide PA12 and with a thickness of 100 μm is placed in the mold and above the fabric (texturing agent T), the layer (1) being in contact with the texturing agent T.

Steps (d) and (e) are identical to that of example 1-a.

Example 2-a: Non-Adhering Layer (1) and Layer (2)

Example 1-a is reproduced with the difference that in step (c), a multilayer film (F) comprising a layer (1) comprising a composition CPO as defined in example 1, but with a thickness of 50 μm and a layer of binder consisting of a grafted PE with 0.6% maleic anhydride (density 0.96 g/cm³, an MFI, Melt Flow Index, measured according to standard ASTM 1238, at 190° C. under 2.16 kg of 2) and with a thickness of 100 μm is placed in the mold and above the fabric (texturing agent T), the layer (1) being in contact with the texturing agent T.

In step (d), a HDPE with a density of 0.96, with MR measured according to standard ASTM 1238, at 190° C. under 2.16 kg of 2, is injected in molten state under the same conditions as the PA12 of example 1a (step d).

Example 3: Compression Mold

A compression mold with two heatable planar plates is used. The temperature of the plates is set to 150° C. The texturing agent and the film of example 1a are included. The texturing agent is placed on the film and both are placed between the two plates which are then placed under a pressure of 50 bars during 1 minute. When the film is cold enough that it can be handled, the texturing agent is removed without any effort. The impression of the fabric on the film is then found as well as a feel that appears similar to that of the texturing agent.

Counter Example 1: Visual and Tactile Structure of the Fabric

A skilled person has attempted to reproduce the visual and tactile structure of the fabric of page 24 of WO 06/008358, The only information provided is the temperature (110° C.), the pressure (20 bars) and the time (5 min).

The thickness of the texturing agent is not given.

The composition of the polyamide is not given.

The thickness of the film is not given,

A skilled person is not able using the data given for the various parameters of the method described in this example to obtain an object as claimed in WO 06/008358.

Counter Example 2

Example 3 of the invention is reproduced except that the temperature of the plates is set to 30° C. The impression of the fabric then cannot be reproduced and the feel of the film is almost unchanged.

Counter Example 3

Example 3 of the invention is reproduced except that the temperature of the plates is set to 250° C. The fabric bonds to the film and it is not possible to correctly detach it from the film.

Counter Example 4

Example 1a of the invention is reproduced except that the mold is set to 20° C. (step a) and that in step d, the pressure is only maintained during 2 seconds.

The result is then negative, the impression of the fabric thus cannot be reproduced and the feel of the film is almost unchanged.

The invention claimed is:

1. A method for preparing an object comprising at least one film comprising at least one layer (1) comprising a composition comprising at least one semi-crystalline polyamide (Psc) having a melt enthalpy of between 25 J/g and 75 J/g during a first Differential Scanning Calorimetry (DSC) heating according to ISO 11357-3:2013 at 40° C./min, the film having on all or part of at least one of its surfaces a texture of a texturing element, wherein the method comprises the following steps:
   a. providing a mold set to a temperature less than or equal to 120° C.,
   b. applying to a wall of the mold, the texturing element having at least partially a textured surface, the textured surface being on a face of the texturing element opposite to a face facing the wall of the mold,
   c. applying to the textured surface of the texturing element, the at least one film comprising at least one layer (1) comprising the composition comprising at least one semi-crystalline polyamide (Psc), the layer (1) being intended for being in contact with the textured surface of the texturing element, a thickness of the layer (1) being at least 10 μm,
   d. applying at least one heating means to the film of step (c), in order to arrive at a temperature on a face of the film facing the texturing element, between a glass transition temperature (Tg) and a melting temperature (Tm) of the composition minus 15° C., the melting temperature (Tm) being measured according to ISO 11357-3:2013, and applying a pressure means to the film in order to bring it into contact with the texturing element, with a pressure between 1.5 and 2000 bars, for a time t between 0.1 seconds and 5 hours,
   e. removing the film from the mold and obtaining the object comprising the film comprising the composition comprising at least semi-crystalline polyamide and having on all or part of at least one of its surfaces the texture of the texturing element, wherein the method comprises, during step d., maintaining the temperature on the face of the film facing the texturing element below the melting temperature (Tm) of the composition minus 15° C.

2. The method according to claim 1, wherein the layer (1) comprising the composition is maintained at a temperature of between Tg and Tm−15° C., over a thickness of at least 10 μm.

3. The method according to claim 1, wherein the applying of the heating means and pressure means consists of injecting a molten polymer at a temperature Tinj between 150° C. and 350° C. onto the face opposite that intended for being in contact with the texturing element of the film of step (c), for a time t between 0.1 seconds and 15 minutes, and the pressure being between 1.5 and 2000 bars.

4. The method according to claim 3, wherein the molten polymer adheres to the layer (1).

5. The method according to claim 4, wherein the film is a single-layer film consists of a layer (1) comprising a composition comprising at least one semi-crystalline polyamide (Psc), the layer (1) having a thickness of at least 10 µm.

6. The method according to claim 4, wherein the molten polymer is a polyamide.

7. The method according to claim 3, wherein the molten polymer lacks adhesion to the semi-crystalline polyamide (Psc).

8. The method according to claim 7, wherein the film is a multilayer film comprising the at least one layer (1) comprising the composition comprising at least one semi-crystalline polyamide (Psc), the layer (1) having a thickness between 20 µm and 1000 µm.

9. The method according to claim 8, wherein the multilayer film comprises at least two layers, the at least one layer (1) and a layer (2), the two layers (1) and (2) adhering to one another, and the layer in contact with the texturing element being the layer (1) comprising the composition comprising the semi-crystalline polyamide (Psc).

10. The method according to claim 9, wherein the molten polymer adheres to the layer (2), the layer (2) being located on the face opposite the layer (1) which is in contact with the texturing element.

11. The method according to claim 8, wherein the multilayer film comprises at least two layers (1) and (2), the layer in contact with the texturing element being the layer (1) of the semi-crystalline polyamide (Psc), the two layers (1) and (2) lacking adhesion to one another and comprising at least one third layer (3) therebetween allowing the adhesion between the layers (1) and (2).

12. The method according to claim 11, wherein the molten polymer adheres to the layer (2), the layer (2) arranged on a face of the layer (3) that is opposite to a face of the layer (3) which is in contact with the layer (1), the layer (1) being in contact with the texturing element.

13. The method according to claim 1, wherein the layer (1), during step d, is at a temperature between the Tg and the Tm−15° C. over a thickness between 5 and 50% of the film, the Tg being determined according to ISO 11357-2:2013 and the Tm according to ISO 11357-3:2013.

14. The method according to claim 1, wherein the composition of the layer (1) has a transparency such that a transmittance at 560 nm on a plate with a thickness of 1 mm is greater than or equal to 80% determined according to standard ISO 13468-2:2006.

15. The method according to claim 1, wherein the composition of the layer (1) comprising the at least one semi-crystalline polyamide (Psc) has a melt enthalpy is between 30 and 50 J/g, the melt enthalpy being determined according to the first DSC heating according to ISO 11357-3:2013 at 40° C./min.

16. The method according to claim 1, wherein the composition of the layer (1) comprising the at least one semi-crystalline polyamide (Psc) has a glass-transition temperature is between 30 and 120° C. and a melting temperature between 150° C. and 330° C.

17. The method according to claim 1, wherein the composition of the layer (1) consists of a transparent composition comprising by weight, the total being 100%:

5 to 40% of an amorphous polyamide (B) which results essentially from a condensation:

either of at least one diamine selected from cycloaliphatic diamines and aliphatic diamines and of at least one diacid selected from cycloaliphatic diacids and aliphatic diacids, at least one of the diamine or the diacid being cycloaliphatic, or of a cycloaliphatic alpha omega amino carboxylic acid, or of a combination of these two possibilities, 0 to 40% of a flexible polyamide (C) selected from polyamide and polyether block copolymers and copolyamides, 0 to 20% of a compatibilizing agent (D) of the semi-crystalline polyamide (Psc) and the amorphous polyamide (B), 0 to 40% of a flexible modifier (MS), with the condition that (C) + (D) + (MS) is between 0 and 50%, the remainder to 100% of the semi-crystalline polyamide (Psc), the semi-crystalline polyamide (Psc) being the majority component with respect to the sum of (Psc)+(B)+(C)+(D).

18. The method according to claim 1, wherein the composition of the layer (1) consists of a transparent composition comprising by weight, the total being 100%:

5 to 40% of an amorphous polyamide (B) which results essentially from condensation of at least one diamine, optionally cycloaliphatic, of at least one aromatic diacid and optionally of at least one monomer selected from:

the alpha omega amino carboxylic acids, the aliphatic diacids, the aliphatic diamines, 0 to 40% of a flexible polyamide (C) selected from polyamide and polyether block copolymers and copolyamides, 0 to 20% of a compatibilizing agent (D) of (Psc) and (B), (C)+(D) is comprised between 0 and 50%, with the condition that (B)+(C)+(D) is not less than 30%, the remainder to 100% of the semi-crystalline polyamide (Psc), the semi-crystalline polyamide (Psc) being the majority component with respect to the sum of (Psc)+(B)+(C)+(D).

19. The method according to claim 17, wherein the semi-crystalline polyamide (Psc) is selected from PA11, PA12, PA1012, PA1010, PA612 and PA610.

20. The method according to claim 1, providing a second texturing element which is different from the texturing element, arranging the second texturing element between the texturing element and the mold, the second texturing element at least partially covering the texturing element.

21. The method according to claim 1, including measuring the temperature on the face of the film facing the texturing element using a sensor that is located at a bottom of the mold at which the texturing element is absent.

22. The method according to claim 21, wherein the sensor is flush with the bottom of the mold.

\* \* \* \* \*